(12) United States Patent
Lee

(10) Patent No.: US 9,934,414 B1
(45) Date of Patent: Apr. 3, 2018

(54) METHOD AND SYSTEM FOR WIRELESS TAG READING

(71) Applicant: Crest Technologies Limited, Quarry Bay (HK)

(72) Inventor: Hui Ling Lee, Quarry Bay (HK)

(73) Assignee: Crest Technologies Limited, Quarry Bay (HK)

( * ) Notice: Subject to any disclaimer, the term of this patent is extended or adjusted under 35 U.S.C. 154(b) by 0 days.

(21) Appl. No.: 15/384,103

(22) Filed: Dec. 19, 2016

(30) Foreign Application Priority Data

Oct. 4, 2016 (HK) .................................. 16111540.4

(51) Int. Cl.
*G06K 7/10* (2006.01)

(52) U.S. Cl.
CPC ..... *G06K 7/10435* (2013.01); *G06K 7/10356* (2013.01)

(58) Field of Classification Search
CPC ........................ G06K 7/10435; G06K 7/10356
USPC ........................................................ 340/10.1
See application file for complete search history.

(56) References Cited

U.S. PATENT DOCUMENTS

| | | | | |
|---|---|---|---|---|
| 2006/0049946 | A1* | 3/2006 | Sullivan | G06K 7/0008 340/572.2 |
| 2007/0279212 | A1* | 12/2007 | Hong | G06K 7/0008 340/514 |
| 2008/0283601 | A1* | 11/2008 | Muraoka | G09F 3/08 235/439 |
| 2012/0157006 | A1* | 6/2012 | Hong | H01Q 1/125 455/67.14 |
| 2014/0167920 | A1* | 6/2014 | Kamiya | G01S 13/58 340/10.1 |
| 2015/0114802 | A1* | 4/2015 | Talbot | B65G 43/00 198/810.01 |
| 2015/0235066 | A1* | 8/2015 | Hattori | G06K 7/10415 340/10.1 |
| 2016/0042204 | A1* | 2/2016 | Tan | G08G 1/017 340/10.1 |

FOREIGN PATENT DOCUMENTS

| | | |
|---|---|---|
| CN | 101872885 A | 10/2010 |
| CN | 103425951 A | 12/2013 |
| CN | 203520456 U | 4/2014 |

(Continued)

OTHER PUBLICATIONS

HK 16111540.4 Search Report, dated Jul. 8, 2015, Crest Technologies Limited (Continued)

*Primary Examiner* — Hirdepal Singh
(74) *Attorney, Agent, or Firm* — Wells St. John P.S.

(57) ABSTRACT

A wireless tag reading system including a frame, two or more antennas installed to the frame, and a turntable rotatable with respect to the frame. The turntable is adapted to support thereon an object containing one or more electronic tags. The turntable is adapted to rotate the object with respect to the two or more antennas, so that at least one of the two or more antennas is configured to read the one or more electronic tags at more than one distance, orientation, or phase. By rotating the object to vary the distance and/or orientation from the tags to the antennas, all the tags on the object can be scanned and correctly read by the wireless tag reader.

14 Claims, 3 Drawing Sheets

(56) References Cited

FOREIGN PATENT DOCUMENTS

| | | | |
|---|---|---|---|
| CN | 104463271 A | | 3/2015 |
| CN | 104573582 A | * | 4/2015 |
| CN | 205540900 U | | 8/2016 |
| JP | 2011-008708 A | | 1/2011 |
| KR | 2011-0134182 A | | 12/2011 |

OTHER PUBLICATIONS

HK 16111540.4 Search Report, dated Nov. 25, 2016, Crest Technologies Limited.

* cited by examiner

METHOD AND SYSTEM FOR WIRELESS TAG READING

RELATED PATENT DATA

This application claims priority to HK 16111540.4, which was filed on Oct. 4, 2016, the teachings of which are incorporated herein by reference.

FIELD OF INVENTION

This invention relates to electronic equipment, and in particular to equipment for reading information stored in electronic tags on goods.

BACKGROUND OF INVENTION

The concept of "Industry 4.0" is the fourth industrial revolution orientated by the intelligent manufacturing which aims at transforming the manufacturing industry to an intelligent one through fully utilizing the combination of the information and communication technologies and Cyber-Physical System. RFID (Radio Frequency Identification) application is one type of message retrieving methods used in the foremost end of intelligentialization. By making use of data fetched through RFID, the database and information center located at the back-end of the Internet of Things may instantaneously grasp new information as well as provide big data for an efficient processing. The creation of RFID used in inventory management and stocktaking, is exactly the basic requirement for achieving in Industrial 4.0 or Internet of Things the timely transmission of information, the accuracy of information, and the automation of information. It will also enable ERP or MES system of companies or factories to effectively understand and apply such data information.

For items which contain RFID tags such as packages, containers, parcels, etc, the conventional way of reading information from these tags is by a staff holding a handheld RFID reader which reads the RFID tags. However, such manual operation is often tedious and prone to errors, since the staff not only has to move around the container to put the reader approximate to the tags, but also he/she has to write down the information obtained from the handheld reader. Another problem is that it is often hard to find the correct tag location, in particular for multiple i in a sequence because the locations of tags may change from item to item. This leads to an imperfect RFID tag reading experience.

SUMMARY OF INVENTION

In the light of the foregoing background, it is an object of the present invention to provide a wireless tag reading system and method which eliminate or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a wireless tag reading system including a frame, two or more antennas installed to the frame, and a turntable rotatable with respect to the frame. The turntable is adapted to support thereon an object containing one or more electronic tags. The turntable is adapted to rotate the object with respect to the two or more antennas, so that at least one of the two or more antennas is configured to read the one or more electronic tags at more than one distance, orientation, or phase.

Preferably, the turntable is adapted to move along a linear direction by a conveying belt with respect to the frame from an first accessing position, in which a user is allowed to access the turntable, to a scanning position, in which the electronic tag on an object supported on the turntable is read by the two or more antennas.

More preferably, in the first accessing position the turntable is located away from the frame.

According to one variation of the preferred embodiment, the system contains a sensing device for detecting whether the object is put on the turntable when the turntable is in the first accessing position.

Preferably, the turntable starts to move from the first accessing position toward the scanning position once the sensing device detected that the object has been placed on the rotatable base.

According to another variation of the preferred embodiment, the turntable continues to move along the linear direction to a second accessing position away from the frame after the reading is completed.

Alternatively, the turntable returns to the first accessing position after the reading is completed.

According to further variation of the preferred embodiment, the turntable is fixed at a location with respect to the frame while still being rotatable. The wireless tag reading system further contains a conveying belt where the object placed on the conveying belt is adapted to be moved along a linear direction from an first accessing position; in which the object is accessible by a user, to a scanning position in which the object is moved onto the rotatable base.

Preferably, the system further comprises sensing device for detecting whether the object is placed on the conveying belt.

More preferably, the conveying belt starts to move the object from the first accessing position toward the scanning position once the sensing device detected that the object has been placed on the conveying belt.

In one implementation, the conveying belt continues to move the object away from the rotatable base along the linear direction to a second accessing position after the reading is completed.

Alternatively, the conveying belt moves the object away from the rotatable base to return to the first accessing position after the reading is completed.

Preferably, the sensing device is an infrared sensor.

In one particular implementation, the reading is completed when a RFID reader connected to the two or more antennas has accessed information of all of the one or more electronic tags.

In another particular implementation, the reading is completed after a period of time has lapsed.

In a further particular implementation, the turntable is adapted to rotate in a 90°, 180°, or 360° range.

In a further particular implementation, the number of the antennas is three.

In a further particular implementation, the frame is a housing, at the interior of which the two or more antennas are installed.

Preferably, the housing is electromagnetic shielding.

According to another aspect of the present invention, there is provided a method for wirelessly reading electronic tags on an object, which includes the steps of placing an object containing one or more electronic tags on a turntable; reading the one or more electronic tags by a plurality of antennas installed to a frame, and in the meantime rotating the object by the turntable; and finishing reading the one or more electronic tags.

Preferably, the turntable is adapted to move in a linear direction relative to the frame. The method further includes the step of moving the turntable which carries the object from a first accessing position away from the frame to a scanning position inside the frame.

In one implementation, the method further comprises the step of moving the object from a first accessing position away from the frame to a scanning position inside the frame by a conveying belt.

In another implementation, the turntable is fixed at the scanning position with respect to the frame but being rotatable in the meantime. The conveying belt moves the object onto the turntable when the object is moved to the scanning position.

According to one variation of the preferred embodiment, the method further contains the step of moving the object back to the first accessing position after the finishing step.

According to another variation of the preferred embodiment, the method further contains the step of moving the object to a second accessing position away from the frame, which is different from the first accessing position.

There are many advantages to the present invention. By configuring multiple RFID tag readers in a housing for reading the RFID tags on an item which is rotated with respect to these tag readers, the data reading efficiency by the tag readers is greatly improved, since there is no blind corner when the item is rotated for example in a 360° range. The RFID tags on the item are therefore always moving during the reading process. No matter how many RFID tags are there in a single item is how intensely they are arranged, by the electromagnetic waves propagating and reflecting characteristics the present invention ensures all of these tags are read correctly by the tag readers. As multiple tag readers are configured, there is provided a fault-tolerance mechanism which avoids the reading errors by a single RFID tag reader.

Another advantage of the present invention is that as an automatic feeding system (e.g. a conveying belt) is used for moving the items to be scanned to the tag reader areas, the whole stocktaking process can be streamlined. The tag identification information obtained from each item is then sent to a computing device so that all the information of items in sequence can be collected and manipulated. This avoids any possible human errors which may have been caused by manual scanning of RFID tags.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
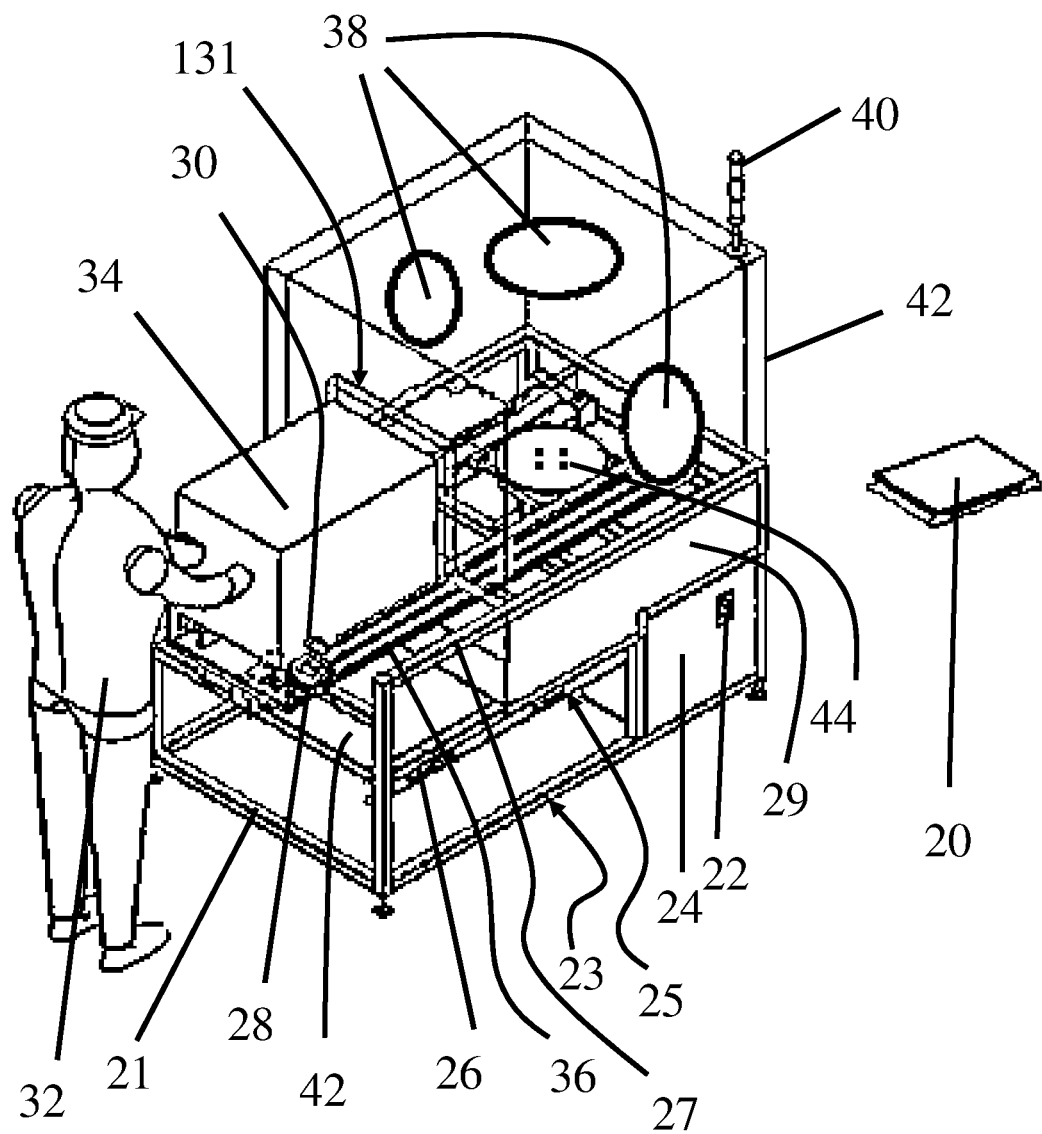
FIG. 1 is a perspective view of a wireless tag reading system according to a first embodiment of the present invention, which is being operated by a human.

Referring now to FIG. 1, the first embodiment of the present invention is a wireless tag reading system which is in the form of floor mounted equipment. On the floor there is a base 21 providing a support for other components of the system. The base 21 has the structure of a multi-layer cabinet. On the bottom layer 23 most of the space can be used for storing odds and ends, and the space is open to the outside with no side walls. On one end of the bottom layer 23 there is a power distribution box 24 which stores necessary components for the wireless tag reading system to operate normally, such as AC-DC converters, transformers, control circuits, etc. (all of which are not shown). There is also a motor speed switch 22 configured on the power distribution box 24 for changing the speed of motors for driving the turntable 44 and/or the conveying belt 36. The power distribution box 24 may be connected to a mains supply via a power cord (not shown). On the second layer 25 of the base 21, there is a stack 42 for receiving a test machine. There is also a socket 26 provided on the second layer 25 for connecting other electrical appliance to the power supply in the wireless tag reading system. A motor box 29 accommodates motors, gear transmissions, and all other mechanisms necessary for the moving parts in the wireless tag reading system to function.

On the top layer 27 of the base 21, there is the conveying belt 36 configured. The conveying belt 36 as skilled persons would understand contains a continuous belt rotating around two separated pulleys, one or both are driven by motors (all not shown). There is also a housing 42 mounted on the base 21 on the top layer 27 where the housing 42 is positioned above the motor box 29. The housing 42 acts like a frame for installing multiple antennas. As shown in FIG. 1 there are three RF antennas 38 mounted to different sides of the cubic shaped housing 42. There is a caution light 40 located on top of the housing 42. An opening 31 is formed at a front end of the housing 42 to allow the items or objects to be scanned entering the housing 42. The housing 42 is preferably designed to be electromagnetic shielding so that external electromagnetic interference will not affect the RF antennas 38 inside the housing 42.

The length of the conveying belt 36 defines an accessing position and a scanning position at its two ends. At the scanning position there is the turntable 44 fixedly mounted with reference to the housing 42, but in the meantime the turntable 44 is still able to rotate. On the other end, a carton 34 as an object to be scanned is put on the conveying belt 36 by the user 32 at the accessing position. The accessing position means that the user can put an object to be scanned on the conveying belt 36 or to take such object away from the conveying belt 36. Near the accessing position on the base 21 there is installed a start switch 28, and an infrared sensor 30 as a sensing device.

A RFID reader device 20 can be connected to the three RF antennas 38 to receive the information read from one or more electronic tags (not shown) on the carton 34. RFID reader device 20 preferably contains a display device for showing the information read from the electronic tags. The RFID reader device 20 may further connects to external computers or servers on networks via wired/wireless communications. The one or more electronic tags in the carton 34 store identification codes for the goods contained in the carton 34.

Now turning to the operation of the device described above. During operation, the user 32 firstly turns on the wireless tag reading system by operating the start switch 28. Then, the user 32 places a carton 34 on the conveying belt 36. The conveying belt 36 is still after power-on and when there is no object or items to be scanned placed thereon. However, as soon as the carton 34 is placed on the conveying belt 36 the presence of the carton 34 is detected by the infrared sensor 30, and a signal is sent from the infrared sensor 30 to the control circuit in the wireless tag reading system (not shown). The control circuit in turn activates the motor (not shown) for driving the conveying belt 36 to move. As the carton 34 is placed on the conveying belt 36, the carton 34 is now moved towards and enters the housing 42. Once the carton 34 moves to the scanning position it is moved onto the turntable 44. Then, the conveying belt 36 stops moving but then the turntable 44 starts to rotate, causing the carton 34 to rotate with respect to the housing 42.

Preferably, once the conveying belt 36 starts to operate to move the carton 34 towards the turntable 44, the RFID reader device 20 as controlled by software installed therein or by external computers starts to work, thus transmitting signals from the RF antennas 38 in an attempt to read any RFID tags on the carton 34. Alternatively, the RFID reader device 20 starts to work and transmits interrogating signal in an attempt to read any RFID tags on the carton 34. In either case, as the carton 34 is moving along a linear direction and/or rotating with respect to the fixed-location RF antennas 38, the RFID tags continue to receive signals from the RF antennas 38 with varying angle, phase, orientation, and/or distance. Since the housing 42 forms a closed space and that the housing 42 is electromagnetic shielding, the RFID tags will receive interrogating signals coming from a large number of direct and indirect paths (e.g. by reflection of signals from the interior wall of housing 42). This ensures that every RFID tag on the carton 34, no matter where it is located, can be accessed with its content read by the RFID reader device 20.

Once the software installed in the RFID reader device 20 or the external computer connected to the RFID reader device 20 detects that all the RFID tags on the carton 34 are read with correct information, then a signal is provided for the RFID reader device 20 to stop reading. Alternatively, the reading is stopped after a certain period of time has elapsed since the RFID reader device 20 started the reading. Such mechanisms ensure that all the tags in the carton 34 are read and that a list of expected goods can all be found in the carton 34 before it exits the wireless tag reading system.

At the same time the RFID reader device 20 stops reading the RFID tags, the turntable 44 also stops rotating. Then, the conveying belt 36 is driven by its motor to start moving again, moving the carton 34 out of the housing 42 and returning to the accessing position. When the carton 34 leaves the housing 42, all the data read by the RFID reader device 20 from the carton 34 are shown on the screen of the RFID reader device 20 or on that of an external computer. If there is any expected goods which is not found among the data read from the carton 34, then a visual or audio warning could be provided to the user 32. The user 32 then takes the carton 34 away from the conveying belt 36. For subsequent items to be scanned, just repeat the above process.

Figure 2:
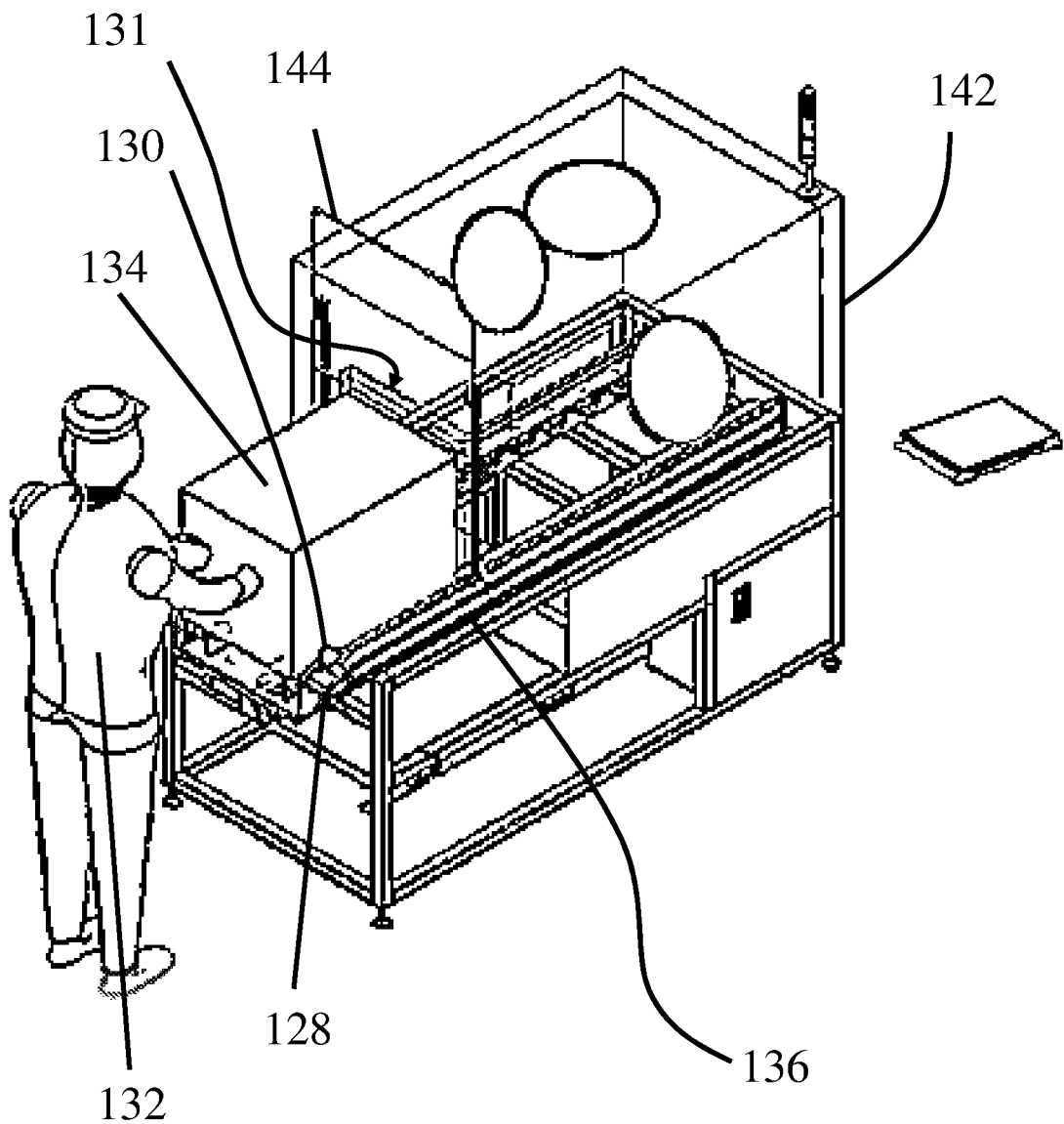
FIG. 2 is a perspective view of a wireless tag reading system according to a second embodiment of the present invention, which is being operated by a human.
Figure 3:
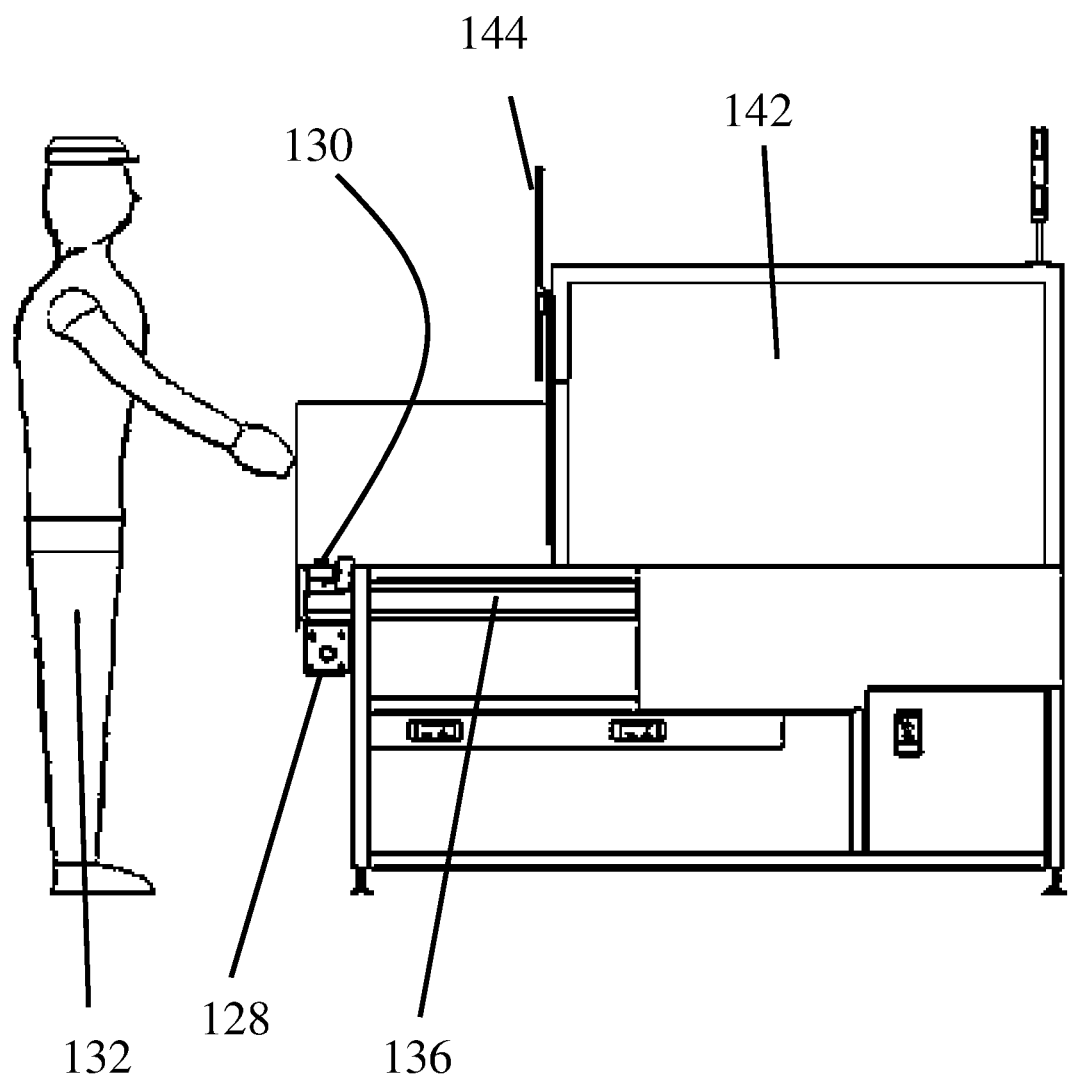
FIG. 3 is the side view of the wireless tag reading system in FIG. 2.

Turning now to FIGS. 2-3, the wireless tag reading system according to another embodiment of the present invention is now described. Most of the features in the wireless tag reading system in FIGS. 2-3 are similar to those in FIG. 1, and only the differences will be described here for the sake of brevity. On the housing 142, there is a screen door 144 which is configured to move vertically in order to close or expose the opening 131 of the housing 142. Also, in the wireless tag reading system in FIGS. 2-3 the turntable (not shown) used to rotate the carton 134 or other items to be scanned is no longer fixed with respect to the housing 142. Instead, the turntable now moves together with the conveying belt 136. The turntable is movable between the accessing position, which is located outside of the housing 142 and where the user 132 can place the carton 134 on the turntable or take the carton 134 away from the turntable, and the scanning position which is inside the housing 142.

After the user 132 turns on the wireless tag system by operating the start switch 128, the infrared sensor 130 detects that the carton 134 is placed on the turntable. The conveying belt 136 then starts to operate and moves the turntable and in turn the carton 134 to the scanning position similar to that shown for the turntable in FIG. 1. When the reading is finished, the turntable is returned to the accessing position and be ready for the next item.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

In the embodiments described above, the object to be scanned by the wireless tag reading system enters the housing through a first opening along a linear direction and then moves away from the housing along an opposite direction, so that the object is returned to the initial or says first accessing position. However, in other variations of the invention there can be a second opening on the housing which is formed on the housing opposite to the first opening. When the RFID tag reading is completed, the object can continue moving along the same direction as it enters the housing to exit the housing through the second opening until it reaches a second accessing position. The second accessing position is therefore on another side of the housing from the first accessing position.

In addition, cartons which have the shape of cubic are described above as an example of item scanned by the wireless tag reading system. However, those skilled in the art would realize that other types of objects, such as those with an irregular shape, large or small, can also be scanned using the wireless tag reading system according to the present invention.

The embodiments described above show a wireless tag reading system with only one conveying belt, and are adapted to process one object at a time. However, it is also possible to have multiple conveying belts in the system, for example by having two vertically overlapping conveying belts in the system so that two objects can be scanned at the same time using a single set of antennas. The processing speed of multiple objects for scanning can therefore be expedited.

Also, RFID is used as an example of electronic tags embedded on an object which can be read by the wireless tag reading system. However, it is also possible for the wireless tag reading system according to the present invention to handle other types of electronics tags, such as NFC tags.

What is claimed is:

1. A wireless tag reading system, comprising:
   a) a frame;
   b) two or more antennas installed to the frame,
   c) a turntable rotatable with respect to the frame;
   wherein the turntable is adapted to support thereon an object comprising one or more electronic tags; the turntable adapted to rotate the object with respect to the two or more antennas, so that at least one of the two or more antennas is configured to read the one or more electronic tags at more than one distance, orientation, or phase;
   wherein the turntable is adapted to move along a linear direction by a conveying belt with respect to the frame from a first accessing position, in which a user is allowed to access the turntable, to a scanning position, in which the electronic tag on an object supported on the turntable is read by the two or more antennas; and
   a sensing device for detecting whether the object is put on the turntable when the turntable is in the first accessing position; the turntable starting to move from the first accessing position toward the scanning position once the sensing device detected that the object has been placed on the turntable.

2. The wireless tag reading system according to claim 1, wherein the turntable continues to move along the linear direction to a second accessing position away from the frame after the reading is completed.

3. The wireless tag reading system according to claim 1, wherein the turntable returns to the first accessing position after the reading is completed.

4. The wireless tag reading system according to claim 1, wherein the turntable is fixed at a location in the scanning position with respect to the frame while still being rotatable; where the object placed on the conveying belt is adapted to be moved along a linear direction from the first accessing position; in which the object is accessible by a user, to the scanning position in which the object is moved onto the turntable.

5. The wireless tag reading system according to claim 1, wherein the sensing device is an infrared sensor.

6. The wireless tag reading system according to claim 1, wherein the reading is completed when a RFID reader connected to two or more antennas has accessed information in all of the one or more electronic tags, or the reading is completed after a period of time has elapsed.

7. The wireless tag reading system according to claim 1, wherein the turntable is adapted to rotate in a 90°, 180°, or 360° range.

8. The wireless tag reading system according to claim 1, wherein the frame is a housing, at the interior of which the two or more antennas are installed.

9. A wireless tag reading system, comprising:
   a) a frame;
   b) two or more antennas installed to the frame,
   c) a turntable rotatable with respect to the frame;
   wherein the turntable is adapted to support thereon an object comprising one or more electronic tags; the turntable adapted to rotate the object with respect to the two or more antennas, so that at least one of the two or more antennas is configured to read the one or more electronic tags at more than one distance, orientation, or phase;
   wherein the turntable is fixed at a location with respect to the frame while still being rotatable; the wireless tag reading system further comprising a conveying belt where the object placed on the conveying belt is adapted to be moved along a linear direction from a first accessing position; in which the object is accessible by a user, to a scanning position in which the object is moved onto the turntable; and
   a sensing device for detecting whether the object is placed on the conveying belt; the conveying belt starting to move the object from the first accessing position toward the scanning position once the sensing device detected that the object has been placed on the conveying belt.

10. A method for wirelessly reading electronic tags on an object, comprising the steps of:
    a) placing the object containing one or more electronic tags on a turntable;
    b) reading the one or more electronic tags by a plurality of antennas installed to a frame, and in the meantime rotating the object by the turntable;
    c) moving the turntable along a linear direction by a conveying belt with respect to the frame from a first accessing position, in which a user is allowed to access the turntable, to a scanning position, in which the electronic tag on the object supported on the turntable is read by the antennas;
    d) detecting whether the object is put on the turntable when the turntable is in the first accessing position; the turntable starting to move from the first accessing position toward the scanning position after detecting that the object has been placed on the turntable; and
    e) finishing reading the one or more electronic tags.

11. The method according to claim 10, wherein the first accessing position is away from the frame and the scanning position is inside the frame.

12. The method according to claim 10, wherein the turntable is fixed at the scanning position with respect to the frame but being rotatable in the meantime; the conveying belt moving the object onto the turntable when the object is moved to the scanning position.

13. The method according to claim 10, further comprises the step of moving the object back to the first accessing position after the finishing step.

14. The method according to claim 10, further comprises the step of moving the object to a second accessing position away from the frame, which is different from the first accessing position.

* * * * *